United States Patent [19]

Mizukoshi

[11] Patent Number: 4,854,917
[45] Date of Patent: Aug. 8, 1989

[54] TRIPOT TYPE CONSTANT VELOCITY UNIVERSAL JOINT

[75] Inventor: Yasumasa Mizukoshi, Fujisawa, Japan

[73] Assignee: Nippon Seiko Kabushiki Kaisha, Tokyo, Japan

[21] Appl. No.: 69,759

[22] Filed: Jul. 6, 1987

[30] Foreign Application Priority Data

Dec. 23, 1986 [JP] Japan .................... 61-305261

[51] Int. Cl.$^4$ ............................................. F16D 3/20
[52] U.S. Cl. ...................................... 464/111; 464/905
[58] Field of Search ..................... 464/111, 123, 905

[56] References Cited

U.S. PATENT DOCUMENTS

| | | | |
|---|---|---|---|
| 3,818,721 | 6/1974 | Wahlmark | 464/111 |
| 4,192,154 | 3/1980 | Nakamura et al. | 464/111 |
| 4,224,806 | 9/1980 | Kobayashi | 464/111 |
| 4,604,077 | 8/1986 | Orain | 464/111 |
| 4,674,993 | 6/1987 | Mazziotti et al. | 464/111 |
| 4,747,803 | 5/1988 | Kimata et al. | 464/111 |

FOREIGN PATENT DOCUMENTS

| | | |
|---|---|---|
| 62-4624 | 1/1987 | Japan . |
| 62-20225 | 2/1987 | Japan . |
| 62-49022 | 3/1987 | Japan . |
| 62-49023 | 3/1987 | Japan . |
| 2161246A | 1/1986 | United Kingdom . |

Primary Examiner—Daniel P. Stodola
Attorney, Agent, or Firm—Shapiro and Shapiro

[57] ABSTRACT

A tripot type constant velocity universal joint comprises a first rotary member provided with three sets of track surfaces each consisting of two parallel planar surfaces, a second rotary member provided with three trunnions corresponding to the track surfaces, and cylindrical roller assemblies loosely fitted to the trunnions and fitted on the track surfaces. The cylindrical roller assemblies are pivoted around corresponding points on the axes of the trunnions. The roller assemblies have a pivot controlling member for controlling pivot of the roller assemblies.

3 Claims, 4 Drawing Sheets

TRIPOT TYPE CONSTANT VELOCITY UNIVERSAL JOINT

BACKGROUND OF THE INVENTION

1. Field of the Invention

This invention relates to a tripot type constant velocity universal joint, and in particular to a tripot type constant velocity universal joint of the type which uses cylindrical rollers and is suitable for use in an automotive vehicle.

2. Related Background Art

In the prior-art tripot type constant velocity universal joint, the track of one rotary member is a concave cylindrical surface and the periphery of a roller loosely fitted onto the trunnion of the other rotary member and engaged with said track is a convex spherical surface and when the joint rotates under a torque with a joint angle present, an axial force is generated on the joint shaft three times per one full rotation of the joint. This axial force is increased or decreased by the influences of the joint angle, the transmitted torque, etc. when the prior-art tripot type constant velocity universal joint is applied to the axle of an automotive vehicle, particularly a vehicle with highoutput engine, the axial force becomes great. There has also been a problem that when the cycle of generation of such axial force coincides with the natural frequency of the vehicle body, the suspension or the like and an axial force great enough to cause resonance of the vehicle body is generated the vehicle seat occupant feels an unpleasant lateral vibration of the vehicle. This has in turn led to inconvenience in the design of a vehicle in that the joint angle must be limited to a relatively small angle.

In respect of this problem, U.S. Pat. No. 3,818,721 (Japanese Patent Publication No. 92448/1974) bears no description of the function and the effect of positively decreasing the axial force, but discloses a tripot type constant velocity universal joint comprising track surfaces formed with three pairs of parallel planar surfaces, and three driving rollers each fixed for rotation and pivotal movement relative to a trunnion and having a cylindrical surface, and each maintained at a predetermined distance from the rotary shaft of the trunnions. This joint has an advantage in that the contact between the rollers and the track surfaces takes place on the generating lines of the outer peripheries of the rollers and no axial force is generated on the axes of the rollers themselves.

However, in such cylindrical type construction according to the prior art, when the joint rotates with a certain angle, each roller rocks and turns on said driving surface and at this time, the roller is freely pivoted relative to the trunnion. Thus, the direction of rolling movement of the roller relative to said driving surface is not perpendicular to the axis of the trunnion, but is arbitrary. In such case, not only a sliding resistance is produced between the rollers and the driving surface, but also a component of this sliding resistance force in the axial direction of the trunnion acts on the rollers. Consequently, a frictional resistance force produced in the portion which supports this component of force hampers smooth rotation of the rollers. These sliding resistance and frictional resistance forces lead to the generation of the axial force.

SUMMARY OF THE INVENTION

It is an object of the present invention to solve the problem of the prior art whereby an axial force is generated by resistance produced between the rollers and the track surfaces, due to the fact that the cylindrical rollers are freely pivoted relative to the trunnions and the directions of rolling movement of the rollers relative to the track surfaces are not perpendicular to the respective axes of the trunnion, but is arbitrary. The gist of the present invention resides in a tripot type constant velocity universal joint comprising a rotary member provided with three tracks each consisting of two parallel planar surfaces, and three cylindrical roller assemblies engaged with said tracks respectively, characterized by the provision of pivoting means permitting the outer race of each of said cylindrical roller assemblies to pivot around a point on the axis of the corresponding trunnion, and pivot controlling means for controlling said pivot of said cylindrical roller assemblies. The tripot type constant velocity universal joint of the present invention is particularly of a construction in which the direction of rolling movement of the cylindrical roller assemblies is positively controlled.

With the above-described construction, the contact between said tracks and said cylindrical roller assemblies takes place on the generating lines of the outer races of said cylindrical roller assemblies. Therefore, the direction of rolling movement of said outer races is controlled to a direction perpendicular to the axes of the trunnions. Therefore, the transmitted force produced in said contact portion which acts in the normal direction of the contact line, acts in a plane containing the axes of the cylindrical roller assemblies, i.e. acts in a plane containing the axes of the three trunnions, and no axial force is generated on the joint shaft perpendicular to this plane.

DESCRIPTION OF THE PREFERRED EMBODIMENTS

Some embodiments of the present invention will hereinafter be described with reference to the drawings.

Embodiment 1

A first embodiment shown in FIGS. 1 to 7 will hereinafter be described in detail.

Figure 1:
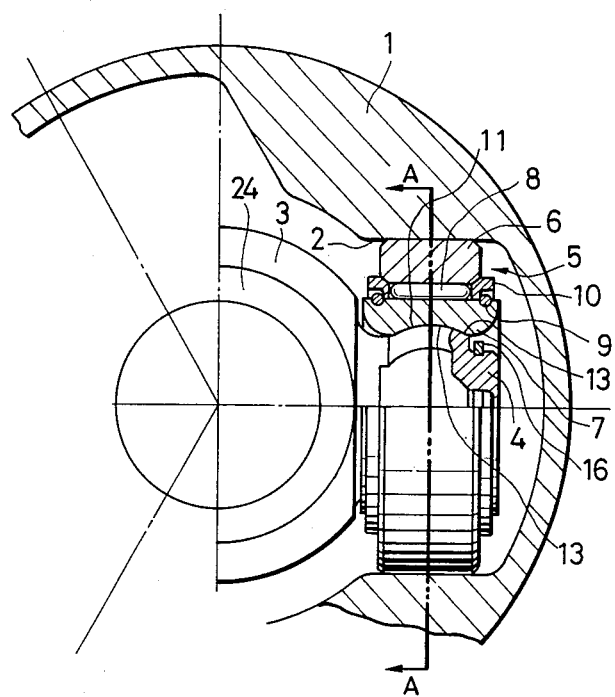
FIG. 1 is a fragmentary cross-sectional view perpendicular to the rotary shaft showing a first embodiment of the present invention.
Figure 2:
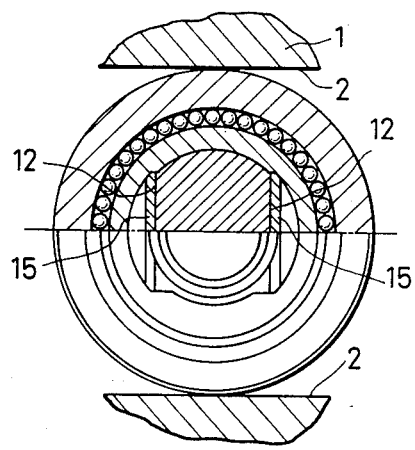
FIG. 2 is a cross-sectional view taken along line A—A of FIG. 1.
Figure 3:
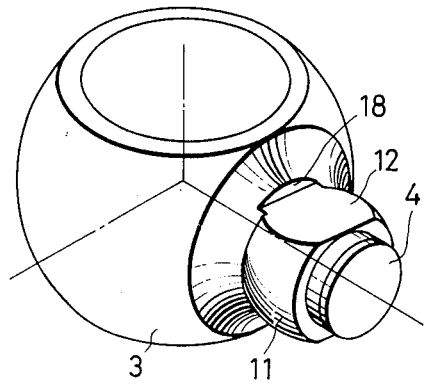
FIG. 3 is a simplified perspective view of a spider used in the first embodiment.
Figure 4:
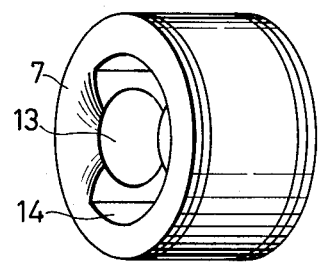
FIG. 4 is a perspective view of an inner race used in the first embodiment.

Referring to FIGS. 1 and 2, a housing 1, which is a first rotary member, is provided with three circumferentially equally spaced tracks 2 which are constituted by two planar surfaces parallel to the axis of the housing and facing parallel to each other. The housing 1 is connected to a transmission (not shown), etc. - for example, through a differential gear or the like (not shown). A spider 3, which is a second rotary member and connected to wheels, for example, through another constant velocity universal joint, is projectedly provided with three trunnion shafts 4 branching off from the boss portion 24 of the spider 3 and circumferentially equally spaced apart. A cylindrical roller assembly 5 engaging with each track 2 is loosely fitted on each trunnion shaft 4. The cylindrical roller assembly is comprised of a cylindrical outer race 6 rolling on the track 2, an inner race 7 loosely fitted to the trunnion shaft 4, and needle rollers 8 constituting a plurality of rolling members interposed between the outer race 6 and the inner race 7. The outer race 6 of the cylindrical roller assembly 5, with the needle rollers 8, has its axial movement limited by a snap ring 9 and a ring 10 fitted on the outer diameter of the inner race 7. On the other hand, smooth rotation is ensured by the rolling movement of the needle rollers 8. Further, as shown in FIG. 3, the outer diameter surface 11 of the trunnion shaft 4 is of a convex spherical shape and a part thereof provides two planar surfaces 12 formed parallel to a plane containing the axes of the three trunnion shafts 4. The inner diameter surface 13 of the inner race 7 is of a concave spherical shape which is in spherical surface contact with the outer diameter surface 11 of the trunnion shaft 4, and an oval-shaped cut-away 14, shown in FIG. 4, extends through a portion of the inner diameter of the inner race 7 axially of the inner race. Guide plates 15 are fitted to the opposite ends of the cut-away 14 and check the two planar surfaces 12 of the trunnion shaft 4. The guide plates 15 are axially retained by a C-shaped snap ring 16 fitted to an end of the trunnion shaft 4. By the above-described construction, the outer race 6 of the cylindrical roller assembly 5 is pivoted around a point on the axis of the trunnion shaft 4, but controlled in such movement to a plane parallel to the plane containing the axes of the three trunnion shafts 4 therefore, the direction of rolling movement of the outer race 6 relative to the aforementioned track is controlled to a direction perpendicular to the axes of the trunnion shafts 4, whereby the generation of an axial force is prevented, and the inclination of the trunnion shafts 4 by the eccentric movement of the center of the spider 3 in the plane containing the axes of the three trunnion shafts 4 (which is peculiar to a tripot type constant velocity universal joint) is completely absorbed.

Figure 5:
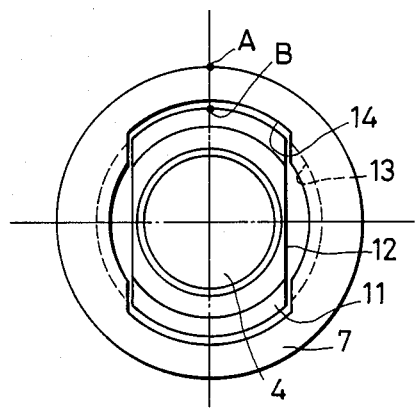
FIG. 5 is a front view showing the course of assembly in which the two planar portions of a trunnion in the first embodiment are adjusted in phase with the oval-shaped cut-aways of the inner race.
Figure 6:
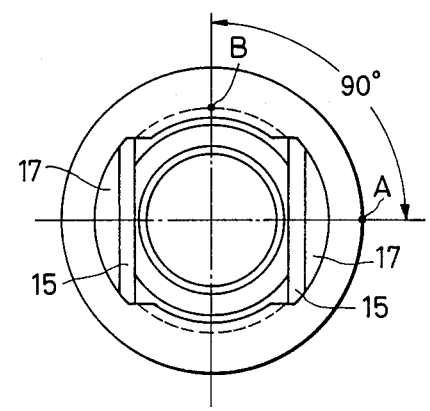
FIG. 6 is a front view of the inner race of FIG. 5 as it is rotated circumferentially by 90° and to which two guide plates are assembled.
Figures 7A, 7B:
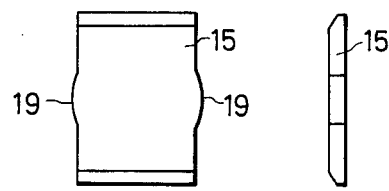
FIG. 7A is a front view of the guide plate.
FIG. 7B is a side view thereof.

A method of assembling the present embodiment is shown in FIGS. 5 to 7. The inner race 7 is inserted onto the trunnion shaft 4 with the phases of the two planar surface portions 12 of the trunnion shaft 4 and the sides of the cut-away 14 of the inner race 7 being adjusted to each other. Then, the inner race 7 is circumferentially rotated by 90° when the centers of the inner and outer spherical surfaces coincide with each other, whereby the spherical surface portions fit to each other. The aforementioned guide plates 15 are inserted into crescent spaces 17 defined by the two planar surface portions 12 of the trunnion shaft 4 and the cut-away 14 in the inner diameter of the inner race, and the C-shaped snap ring 16 is fitted thereto, whereupon the cylindrical roller assembly 5 is positioned axially to the trunnion shaft 4 and assembled.

The guide plates 15 fitted to the inner race 7 are pivoted with the inner race 7 relative to the trunnion shaft 4 only in a plane parallel to the two planar surfaces 12 of the trunnion shaft 4. For this reason, convex portions 19 are provided in the central portions of the opposite sides of the plate width so that the guide plates do not interfere with the end portions 18 of said two planar surfaces at the root of the trunnion shaft 4 and with the C-shaped snap ring 16 fitted to the end of the trunnion shaft 4.

Embodiment 2

Figure 10:
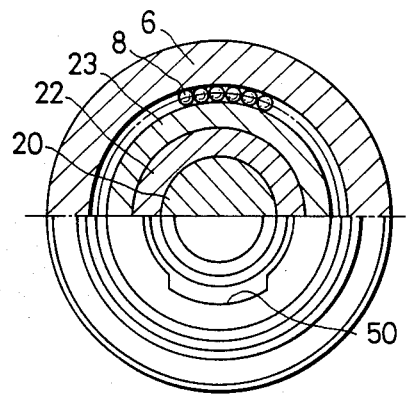
FIG. 10 is a side view of the FIG. 8 second embodiment.
Figure 8:
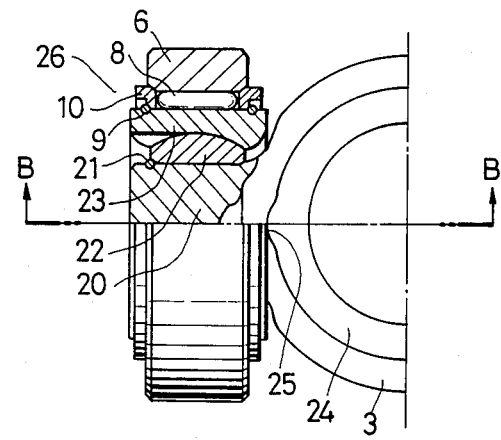
FIG. 8 is a fragmentary cross-sectional view showing a second embodiment of the present invention.
Figure 9:
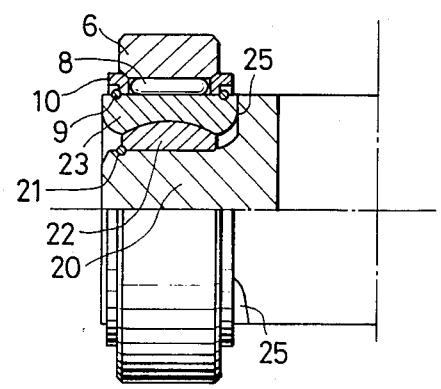
FIG. 9 is a cross-sectional view taken along line B—B of FIG. 8.

A second embodiment shown in FIGS. 8 to 10 will now be described in detail. In the first embodiment, the outer diameter of the trunnion shafts 4 is spherical, whereas in the present embodiment, the outer diameter of trunnion shafts 20 is cylindrical and the trunnion comprises trunnion shafts 20 and spherical bushings 22 fitted to the trunnion shafts 20 and fixed axially to the trunnion shafts 20 by snap rings 21, the outer diameter of the spherical bushings 22 being of a convex spherical shape. The inner diameter surface of an inner race 23 is of a concave shape which is in spherical surface contact with the outer diameter surface of the spherical bushings 22. The combination of the spherical surfaces can be accomplished by inserting the spherical bushing 22 into a cut-away 50 in the inner race 23 and rotating the spherical bushing 22 by 90° when the centers of the inner and outer spherical surfaces coincide with each other. The pivot controlling means in the present embodiment is of such a construction that a boss portion 24 on which the trunnion shafts 20 are projectedly provided, has projections 25 that are arranged symmetrically with respect to the axes of the trunnion shafts 20, on a line perpendicular to a plane containing the axes of the three trunnion shafts 20 and passing through the axes of the trunnion shafts 20. The projections 25 bear against the end surface of the inner race 23 to control the pivot, and the outer race 6 of a cylindrical roller assembly 26 similar in construction to Embodiment 1 pivots around a point on the axis of the trunnion shaft 20, but is controlled in such movement to a plane parallel to the plane containing the axes of the three trunnion shafts 20. Therefore, the direction of rolling movement of the outer race 6 is controlled to a direction perpendicular to the axis of the trunnion shaft 20 and the generation of an axial force is prevented.

Embodiment 3

Figure 11:
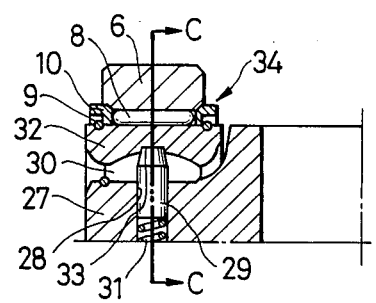
FIG. 11 is a fragmentary cross-sectional view showing a third embodiment of the present invention.
Figure 12:
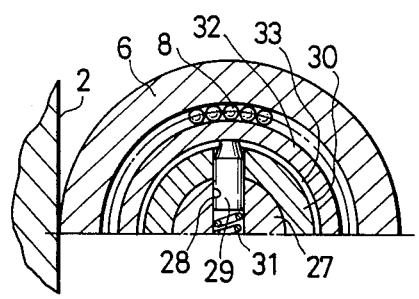
FIG. 12 is a cross-sectional view taken along line C—C of FIG. 11.

A third embodiment shown in FIGS. 11 and 12 will now be described in detail. This embodiment is the same as the second embodiment except for the pivot controlling means, and members similar to those in the second embodiment are given similar reference numerals and the description of these members is omitted. The pivot controlling means in the present embodiment is of a construction in which a bore 28 perpendicular to a plane containing the axes of three trunnion shafts 27 and passing through the axes of the trunnion shafts 27 is formed in the central portion of each trunnion shaft 27 and a spherical bushing 30. A pin 29 is resiliently mounted in the bore 28 by means of a spring 31 so that the tip end thereof protrudes from the outer diameter surface of spherical bushing 30 and said tip end bears against a groove 33 formed in the inner diameter of an inner race 32. The outer race 6 of a cylindrical roller assembly 34 pivots only in a direction around the axis of the pin 29 and therefore, the direction of rolling movement of the outer race 6 is controlled to a direction perpendicular to the axes of the trunnion shafts 27, whereby the generation of an axial force is prevented.

In order to facilitate the assembly, the spherical bushing 30 may be divided into two parts.

Embodiment 4

Figure 13:
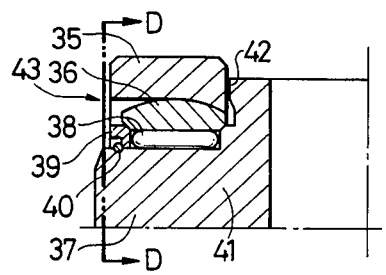
FIG. 13 is a fragmentary cross-sectional view showing a fourth embodiment of the present invention.
Figure 14:
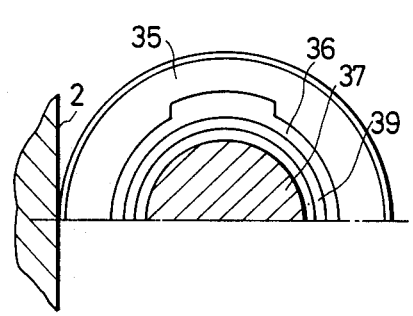
FIG. 14 is a cross-sectional view taken along line D—D of FIG. 13.

A fourth embodiment shown in FIGS. 13 and 14 will now be described in detail. The cylindrical roller assembly 43 of the present embodiment is comprised of a cylindrical outer race 35 whose inner diameter surface is of a concave spherical shape, an inner race 36 whose outer diameter surface is of a convex spherical shape and which is fitted to and in spherical surface contact with the outer race 35 and is pivoted therein. A plurality of needle rollers 38 is interposed between the inner race 36 and trunnion shafts 37, and a ring 39 and a snap ring 40 are fitted to the end of each trunnion shaft 37 to limit the axial movement of the needle rollers 38 and inner race 36 relative to the trunnion shaft 37. The pivot controlling means is of a construction in which a boss portion 41 on which the trunnion shafts 37 are projectedly provided has projections 42 that are arranged symmetrically with respect to the axes of the trunnion shafts 37, on a line perpendicular to a plane containing the axes of the three trunnion shafts 37 and passing through the axes of the trunnion shafts 37. The projections 42 bear against the end surface of the outer race 35 to control pivot. The outer race 35 of the cylindrical roller assembly 43 pivots around a point on the axis of the trunnion shaft 37, but is controlled in such movement to a plane parallel to the plane containing the axes of the three trunnion shafts 37. Therefore, the direction of rolling movement of the outer race is controlled to a direction perpendicular to the axes of the trunnions, whereby the generation of an axial force is prevented.

Embodiment 5

Figure 15:
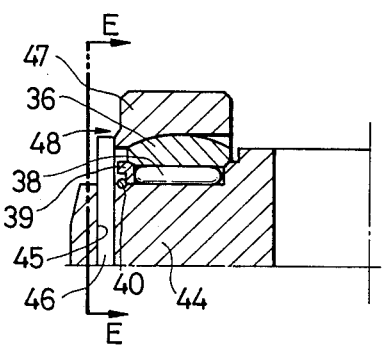
FIG. 15 is a fragmentary cross-sectional view showing a fifth embodiment of the present invention.
Figure 16:
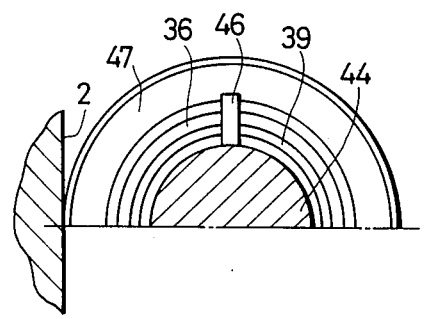
FIG. 16 is a cross-sectional view taken along line E—E of FIG. 15.

A fifth embodiment shown in FIGS. 15 and 16 will now be described in detail. The embodiment is the same as the fourth embodiment except for the pivot controlling means, and members similar to those in the fourth embodiment are given similar reference numerals and the description of these members is omitted. The pivot controlling means in the present embodiment is of a construction in which the end portion of each trunnion shaft 44 is provided with a pin bore 45 on a line perpendicular to a plane containing the axes of three trunnion shafts 44 and passing through the axis of the corresponding trunnion shaft 44. A pin 46 is inserted in the pin bore 45, and the opposite ends of the pin 46 bear against the end surface of an outer race 47 to control pivot. The outer race 47 of a cylindrical roller assembly 48 pivots around a point on the axis of the trunnion shaft 44, but is controlled in such movement to a plane parallel to the plane containing the axes of the three trunnion shafts 44. Therefore, the direction of rolling movement of the outer race is controlled to a direction perpendicular to the axes of the trunnion shafts 44, whereby the generation of an axial force is prevented.

As described above, the outer race of the cylindrical roller assembly smoothly rolls on the track of the first rotary member while being controlled its rolling movement to a direction perpendicular to the axis of the trunnion. Consequently, the sliding resistance and friction resistance forces caused by the conventional cylindrical roller, which pivots freely in all directions relative to the trunnion and rolls relative to the track surface in other directions than a direction perpendicular to the axis of the trunnion, can be eliminated. Thus, becomes possible to prevent the generation of the axial force three times per one full rotation of the joint, and the use of such assembly, for example, in the joint portion of the axle of an automotive vehicle can greatly reduce the unpleasant sensation to the vehicle seat occupant caused by the lateral vibration of the vehicle body.

It should be understood that the present invention is not restricted to the embodiments illustrated herein, but various modifications and changes can be made therein without departing from the scope of the invention as defined in the appended claims.

I claim:

1. A tripot type constant velocity universal joint comprising:
    a first rotary member provided with three pairs of parallel planar track surfaces,
    a second rotary member constituted by a spider having three trunnions corresponding to said track surfaces and branching off in three equally spaced apart directions and from a boss portion of said spider, and
    a respective cylindrical roller assembly loosely fitted to each trunnion and engaged with the corresponding track surface pair,
    said cylindrical roller assembly comprising a cylindrical outer race rolling on the corresponding track surface pair, an inner race loosely fitted to said trunnion and a plurality of rolling members interposed between said outer race and said inner race,
    said inner race having an inner peripheral surface portion of concave spherical shape and said trunnion having an outer peripheral surface portion of convex spherical shape in spherical surface contact with said surface portion of said inner race such that said cylindrical roller assembly is pivotally movable about a point on an axis of said trunnion,
    said trunnion and said roller assembly having cooperable pivot controlling means for restricting the pivotal movement of the roller assembly to planes parallel to a plane containing the axes of said three trunnions such that the direction of rolling movement of the roller assembly relative to the corresponding track surface pair is perpendicular to the axis of said trunnion, said pivot controlling means including a pair of planar surface portions formed on opposite sides of the outer periphery of said trunnion in planes parallel to a plane containing the axes of said three trunnions, and a pair of corresponding guide plates carried by respective internal cutouts of said inner race, said guide plates being held against rotation relative to said inner race and in sliding surface-to-surface engagement with said planar surface portions of said trunnion.

2. A tripot type constant velocity universal joint according to claim 1, wherein each guide plate has a projecting convex end portion disposed to prevent interference between the guide plate and a root portion of said trunnion.

3. A tripot type constant velocity universal joint according to claim 2, wherein said inner race is axially secured to said trunnion by a snap ring, and each guide plate has an opposite convex end portion disposed to prevent interference between the guide plate and said snap ring.

* * * * *